Patented Feb. 10, 1953

2,628,199

UNITED STATES PATENT OFFICE 2,628,199

TARNISH REMOVER

Frederick A. Lowenheim, Plainfield, N. J.

No Drawing. Application December 21, 1949,
Serial No. 134,360

8 Claims. (Cl. 252—142)

This invention relates to a composition for removing tarnish and oxide films and the like from metal surfaces without attacking the metal. More particularly, it relates to a composition for cleaning such metals as silver, silver plate, copper, brass, bronze and other copper alloys.

In its essence, the composition consists essentially of an acid having a pK in the range of 1 to 5 and thiourea. By the expression "pK" is meant the negative logarithm of the dissociation constant, K. While not limited thereto, it is intended to provide the composition in the form of a dry powder mixture and to require a purchaser, before using the same, to add water to the mixture, the amount of water to depend upon the character of the impurities to be removed from the metal surfaces. The invention, however, also contemplates a composition that is initially aqueous. The ingredients of the compositions are water-soluble.

Generally speaking, the dry mixture comprises a normally solid acid having a pK in the range of 1 to 5 and thiourea. The amount of thiourea should exceed the amount of acid with the former comprising about 3 to 5 parts by weight, preferably 4, per part of acid. This mixture is dissolved in water and the article to be cleaned is simply immersed therein for a time sufficient to remove the impurities, which in practice may range from a few seconds up to about 15 minutes or more. The action of the solution may be improved by incorporating a wetting agent therein, or, as is preferable, by adding a wetting agent in solid form to the dry powder mixture.

As examples of solid acids having a pK of 1 to 5, there may be mentioned citric, oxalic, tartaric, phthalic, and succinic acids. These, as is essential, are all water-soluble, stable, non-oxidizing acids which do not form water-insoluble compounds with copper or silver. They are also polybasic acids. Acids having a pK of less than 1 are too corrosive for the purpose intended, while acids having a pK greater than 5 are inoperable. The preferred acids are the aliphatic, polybasic, hydroxy acids like citric and tartaric, which are non-toxic and non-irritating to the skin.

Besides thiourea, simple alkyl derivatives thereof such as methyl or ethyl thiourea are also useful. These derivatives are contemplated by the expression "thiourea".

As wetting agents there may be mentioned such materials as lauryl alcohol derivatives, salts of substituted aromatic sulfonic acids, sulfonated fatty alcohols, sulfonated vegetable oil, highly sulfonated fatty acid esters, diglycol stearate, organic acid esters of diethylene glycol, N-alkylol fatty amides, polyoxyalkylene esters, complex amides of fatty acids, higher aliphatic and mixed aliphatic-aromatic quaternary ammonium halides, higher aliphatic amines, etc.

As an example of a dry mixture, 200 parts of powdered thiourea and 50 parts of powdered citric acid were mixed, and then 8 parts of a powdered commercial lauryl alcohol derivative was added thereto. This mixture was dissolved in water, the amount of which is not critical, and was found to be effective to remove the tarnish from silver, copper and copper alloys. Another powder mixture containing 50 g. of thiourea, 10 g. of citric acid, and 1 g. of the above mentioned wetting agent was added to 1 liter of water. This solution was also found to be effective for removing tarnish from silver, copper and copper alloy articles merely by dipping.

For impurities that are difficult to remove, the action of the composition may be aided by incorporating an abrasive agent either to the dry mixture or to the aqueous solution of the same and then employing a slight rubbing action in conjunction with the immersion treatment. Any conventional abrasive such as infusorial earth, diatomaceous earth, etc. is useful for this purpose. As an example of a dry powder containing an abrasive, a mixture of 400 parts of thiourea, 100 parts of citric acid, 10 parts of wetting agent and 100 parts of diatomaceous earth was prepared. While desirable in some cases, an abrasive is not always necessary, as stubborn impurities can often be removed by treating them with a non-abrasive-containing composition to which just enough water has been added to moisten the powder without dissolving it. In such cases, only very gentle rubbing may be necessary to effect the desired result.

It may be noted that the dry mixtures disclosed herein possess a desirable advantage in being packageable in dry form, in distinction to a paste or liquid. The mixtures are not corrosive to ordinary packing materials, nor are the aqueous solutions of the same corrosive in respect to the metals that are to be cleaned.

As indicated, other compositions comprising aqueous mixtures may be useful. These preferably comprise acids that are normally liquid, such as acetic, formic, maleic and phosphoric, all of which have a pK of 1 to 5. Like the solid acids, they are water-soluble, stable, non-oxidizing, and do not form water-insoluble compounds with copper or silver. Compositions containing these acids may be formed as described above, the thiourea going into solution in the acid. Preferably a liquid wetting agent is used. As will be apparent, aqueous compositions for immediate use may also be prepared from the solid acids.

In the light of the foregoing description, the following is claimed:

1. A cleaning composition for silver- and copper-containing metal surfaces consisting essentially of 1 part by weight of an acid having a pK in the range of 1 to 5 and about 3 to 5 parts by weight of thiourea, said acid being water-soluble, stable, non-oxidizing, and forming no water-insoluble compounds with copper or silver.

2. A cleaner for silver, copper, and copper alloys comprising a dry powder mixture consisting essentially of 1 part by weight of a solid acid having a pK in the range of 1 to 5 and about 3 to 5 parts by weight of thiourea, said acid being water-soluble, stable, non-oxidizing, and forming no water-insoluble compounds with copper or silver, said mixture being adapted to be dissolved in water before use.

3. A cleaner for silver, copper, and copper alloys comprising a dry powder mixture consisting essentially of 1 part by weight of an aliphatic, polybasic, solid acid having a pK in the range of 1 to 5 and about 4 parts by weight of thiourea, said acid being water-soluble, stable, non-oxidizing, and forming no water-insoluble compounds with cooper or silver, said mixture being adapted to be at least partially treated with water before use.

4. A cleaner according to claim 3 in which the acid is tartaric.

5. A cleaner according to claim 3 in which the acid is oxalic.

6. A cleaner for silver, copper, and copper alloys comprising a dry powder mixture consisting essentially of 1 part by weight of citric acid and about 3 to 5 parts by weight of thiourea, said mixture being adapted to be at least partially treated with water before use.

7. A cleaner for silver- and copper-containing metal surfaces consisting essentially of 1 part by weight of an organic acid having a pK in the range of 1 to 5 and about 3 to 5 parts by weight of thiourea, said acid being water-soluble, stable, non-oxidizing, and forming no water-insoluble compounds with copper or silver.

8. A cleaner for silver, copper, and copper alloys comprising a dry powder mixture consisting essentially of 1 part by weight of a solid organic acid having a pK in the range of 1 to 5 and about 3 to 5 parts by weight of thiourea, said acid being water-soluble, stable, non-oxidizing, and forming no water-insoluble compounds with copper or silver, said mixture being adapted to be dissolved in water before use.

FREDERICK A. LOWENHEIM.

REFERENCES CITED

The following references are of record in the file of this patent:

UNITED STATES PATENTS

| Number | Name | Date |
|---|---|---|
| 1,608,622 | Schmidt et al. | Nov. 30, 1926 |
| 2,071,966 | Bolton | Feb. 23, 1937 |
| 2,383,800 | Johnson | Aug. 28, 1945 |
| 2,393,866 | Wassell | Jan. 29, 1946 |
| 2,485,529 | Cardwell et al. | Oct. 18, 1949 |